Dec. 19, 1961     H. D. HODGES     3,013,522

DRIVERS SIGHTING GUIDE

Original Filed Aug. 17, 1956

INVENTOR.
HARRY D. HODGES
BY

United States Patent Office 3,013,522
Patented Dec. 19, 1961

3,013,522
DRIVERS SIGHTING GUIDE
Harry D. Hodges, Lake Preston, S. Dak.
Original application Aug. 17, 1956, Ser. No. 604,675. Divided and this application Feb. 16, 1959, Ser. No. 793,392
1 Claim. (Cl. 116—28)

This invention relates to automobiles and particularly it is an object to provide a sighting guide projecting outwardly from the side of the automobile in a position such that the driver looking out of his window can see the end of the guide and judge its distance from a curb or other obstacle to better know his position with respect thereto.

Driving is particularly difficult for the aged and the physically handicapped and this is particularly true if they are relatively short as makes leaning out of a window from the driver's seat difficult and for some impossible. The problem of spacing a car from a curb is an annoyance to any driver, particularly when their nerves are on edge, so to speak, from the strain of driving.

It is therefore an object to provide a sighting guide projecting outwardly from the side of a car a sufficient and substantial distance so as to be practical for serving the purpose of providing a point across which a driver can sight from a driving position and without leaning out of the window.

I am aware that wires and other devices have been extended from fenders for the purpose of determining by sound the spacing of fenders from curbs, however, these have soon been accidentally displaced and usually extend downwardly from the fender so that their outer ends are down too low to be seen from the normal driving position, even for taller drivers.

More particularly it is an object to provide a sighting guide which is formed of inflatable resilient material and which is provided with a valve for maintaining its inflation. The advantage of this construction is that the inflation enables the sighting guide to be of much greater length and yet hold its shape without the thickness of the material of heavy thickness are two-fold: firstly, a heavy thickness is expensive, secondly, and more importantly, the heavy thickness results in a sighting guide which is less adaptable to collapse upon striking another car whereby the fender of another car might be dented.

When a device is long enough to serve substantially and practically the purpose of a sighting guide rather than a mere protector, then it takes up a considerable space so that in crowded parking areas it might strike another car, therefore, it is particularly important that the guide be able to collapse readily so that it does not dent the fenders of an adjacent car. Hence the importance of my inflatable concept.

A further object is to provide a sighting guide which is large, much larger than the wire fender mounted audible warning of prior art so that it can be more readily seen.

Another object is to provide a sighting guide the outer end of which has a finger extending rearwardly so as to be closer to the driver's seat thereby more easily seen, even though the inner base of the sighting guide must be mounted forwardly of rearwardly extending finger in order not to be undesirably mounted on the door of the automobile.

A further object is to provide a threaded stud mounting for the sighting guide as described.

A further object of this invention is to provide a car mounted device adapted to project outwardly from the side of an automobile thereby giving the automobile an appearance of being substantially wider than the solid metal parts of the automobile actually are. However, my device is actually not solid, but is collapsible whereby if it should be bumped by an oncoming car, then no damage of any substantial nature would occur.

I have discovered the concept of causing an oncoming driver to feel that a car is actually wider than it really is, thereby causing the oncoming driver to give the car adequate room is, in the end, a kind consideration, both to the driver having my device and to the driver of an oncoming car. It is my opinion that this device can avoid many collisions, especially when meeting other cars or long semi-trailer trucks on a curve where it is often a careless habit of drivers not to stay in their own lane thereby forcing other drivers to drive with one side of their car off of the hard surface on dangerous, uneven ground.

A particular object is to provide a device that can have its ideal effect when two cars are approaching each other in different lanes with both cars using the devices of my invention, whereby both drivers tend to remain those few inches farther from the other car that are so necessary to avoid a side-swiping collision, so common in heavy traffic.

A particular objective is to provide a device which will prevent collisions in this fashion especially on automobiles that are being made wider and wider with each new car styling whereas so many of the nation's roads are still of the same size.

This application is a division of my co-pending application filed August 17, 1956, with the Serial No. 604,675, now abandoned, and includes only the subject matter and claims of that patent which had been non-elected.

Other features and advantages of the invention will appear from the following description taken in connection with the drawings, wherein.

Figure 1:
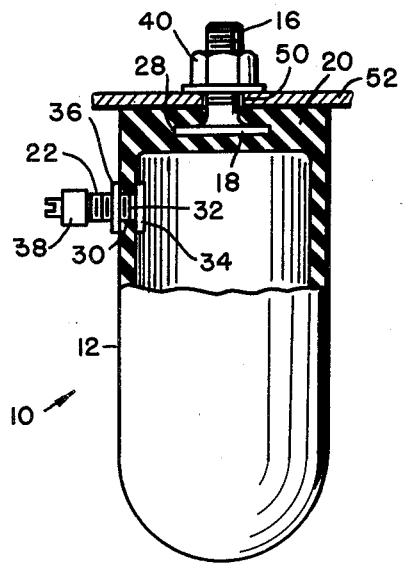
FIGURE 1 is an elevational view of the improved driving guide with part broken away showing the mounting of a threaded stud and air valve therein.

While one embodiment of the invention is illustrated in the above-referred-to drawings it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention it remains obvious that it may be employed in any other capacity wherein it may be found applicable.

In the accompanying drawings and in the following specification, the same reference characters are used to designate the same parts and elements throughout, and in which the numeral 10 refers to the invention, a driving guide or drivers sighting guide, in its entirety, numeral 12 indicating a cylindrical body of rubber, or other resilient material, numeral 14 a finger extended from one end of the body, numeral 16 a threaded stud having a head 18 embedded in a base 20 in the end of the body opposite to that from which the finger extends, and numeral 22 an air valve similar to valves of motor vehicle tires.

Figure 3:
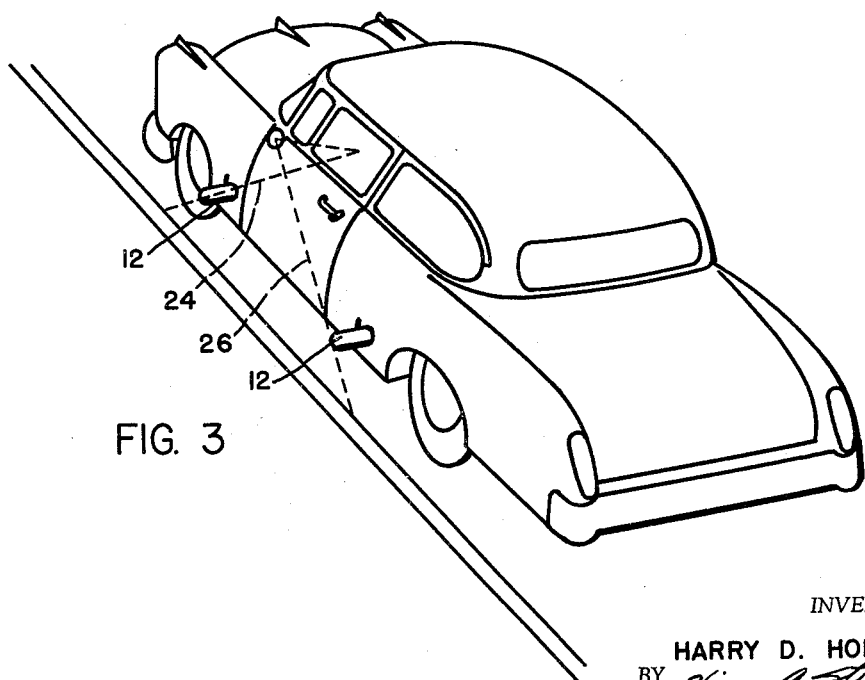
FIGURE 3 is a perspective view showing the driving guide on the side of a motor vehicle with lines of sight of an operator of the vehicle passing over ends of two of the guides, the lines of sight being indicated by broken lines.

The length of the body 12 is such that the tip of the finger 14 will contact the surface of another vehicle before metal parts of the vehicles engage, and also so that the line of sight of an operator of a vehicle upon which the driving guide is installed will establish the distance of a vehicle from a curb by passing over the ends of the driving guides, as indicated by the broken lines 24 and 26, in FIGURE 3.

The base 20 of the guide is provided with an opening 28 in which the head 18 of the stud 16 is positioned, and the side wall is provided with an opening 30 in which the base 32 of the air valve 22 is positioned. The base 32 of the valve 22 is formed with a head 34 and a lock nut 36 is threaded on the stem. The end of the valve stem is provided with a cap 38 and the outer end of the stud 16 is provided with a nut 40 and a washer 42.

Figure 2:
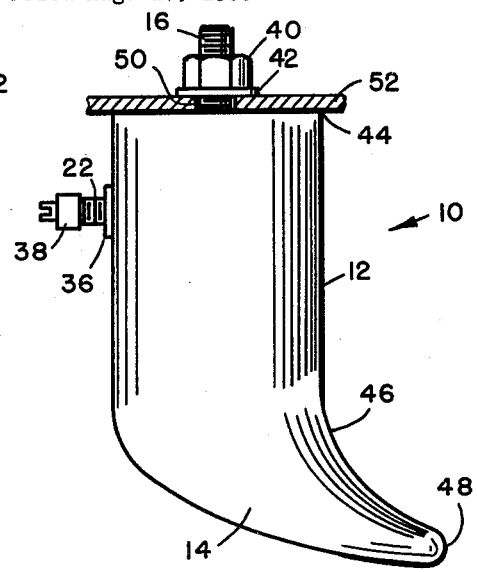
FIGURE 2 is a view similar to that shown in FIGURE 1, showing a modification wherein the end of the guide is extended downwardly.

The body 12, in the modification of FIGURE 2, is substantially cylindrical from the base or inner end 44 to the point 46, and from the point 46 the finger is curved rearwardly to a tip 48, forming the finger 14.

Operation

In installing the driving guide the stud 16 is inserted in an opening 50 in a fender or side wall 52 of a motor vehicle and the washer and nut are applied to the end of the stud thereby securing the guide in position on a vehicle. The guide may be used at atmospheric pressure, or air under pressure may be supplied to the interior of the guide through the air valve 22.

With the driving guides extended from the sides of a vehicle the operator of a vehicle may readily ascertain the exact distance between walls of vehicles, and also the distance of a vehicle from a curb. By this means actual contact of one vehicle with another, particularly in passing, is obviated.

It will be seen that it is very important that the sighting guide extend outwardly from the side of the car a substantial and sufficient distance for the purpose of making it possible for the driver to see the end of the guide from a normal driving position as is not a characteristic of mere fender protectors of the prior art.

It will be further seen that the rearward tip of the finger 48 is more easily seen by the driver and is closer to the driver than forward portions of the sighting guide because the forward base of the guide must be anchored forwardly of the door of the automobile for ease of installation, hence the importance of rearward extending finger 48.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts such as come within the purview of the invention claimed may be resorted to in actual practice if desired.

Having now described the invention that which is claimed to be new and desired to be procured by Letters Patent, is:

A driving guide adapted to be attached to the side of an automobile, said guide being cylindrical in cross section and having an arcuate laterally and horizontally disposed outer end terminating in a point, said guide being substantially elongated whereby a driver can sight across its outer pointed end from the driver's seat and determine the position of the outer end of the driving guide from a curb, said driving guide being hollow and inflatable, and being provided with a valve stem assembly for its inflation, said guide being formed of relatively thin and inexpensive material and adapted to hold its desired shape when inflated to a required pressure, said guide having a substantially flat thickened inner end for positioning against the side of an automobile, said guide further having means attached to said inner end for connecting said guide to the side of said automobile, said means comprising a stud having an enlarged head on one end that is embedded in said thickened end and a nut and washer positioned on said stud for clamping said guide against the outer surface of said side of said automobile.

References Cited in the file of this patent

UNITED STATES PATENTS

| | | |
|---|---|---|
| 2,153,896 | Mohar | Apr. 11, 1939 |
| 2,305,205 | Strauch | Dec. 15, 1942 |
| 2,731,289 | Corydon | Jan. 17, 1956 |
| 2,806,730 | Marshall | Sept. 17, 1957 |